W. W. SAWYER.
DUMPING WAGON-JACK.

No. 182,331.  Patented Sept. 19, 1876.

WITNESSES  INVENTOR

UNITED STATES PATENT OFFICE.

WILLIAM W. SAWYER, OF BOSTON, MASSACHUSETTS.

IMPROVEMENT IN DUMPING-WAGON JACKS.

Specification forming part of Letters Patent No. 182,331, dated September 19, 1876; application filed February 28, 1876.

*To all whom it may concern:*

Be it known that I, WILLIAM W. SAWYER, of Boston, in the county of Suffolk and State of Massachusetts, have invented Improvement in Jacks for Dump-Carts, of which the following is a specification:

This invention has for its object the construction, arrangement, and location of a lifting-jack in relation to the truck and body of a cart, so that the jack may be operated from a stationary point on the side of the truck, preferably at the left of the rocker.

I will explain my invention, with the aid of the accompanying drawing, forming a part of this specification, in which—

Figure 1:
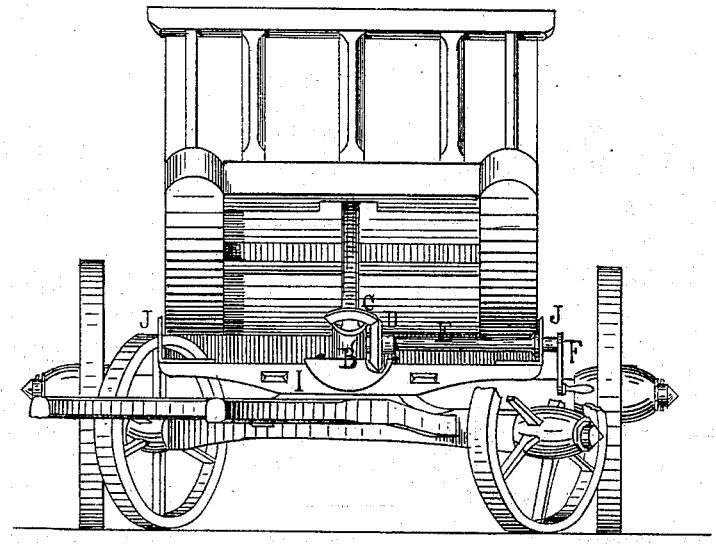
Figures 2, 3:
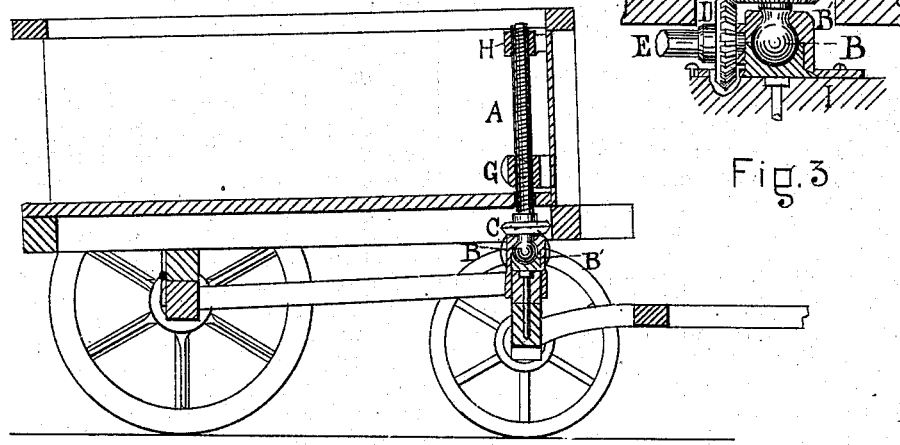

Figure 1 is an elevation of the front of the cart, showing the construction and location of my invention. Fig. 2 is a cross-vertical section of a part of the same. Fig. 3 is an enlarged section.

The screw-spindle A is supported on the ball-joint B, which is a part thereof, and caused to revolve in the socket B' by the bevel-gear C D, extended rod E, and crank F. The spindle engages with the swiveling-nut G, which is permanently attached to the front of the cart-body at or near the bottom, and the guide H when the body of the cart rests on the forward truck. I prefer to arrange the socket upon the rocker I at the center of its length, but it may also rest upon an extension of the perches. The operating-rod E is carried to the end of the rocker, as shown, where the guide J furnishes a bearing. By the operation of the crank the spindle is caused to revolve in the swiveling-nut and the body of the cart to rise. Of course the screw-spindle, swiveling-nut, &c., may be arranged outside the front, if desirable. By this construction and location I am enabled to lift the body of the cart easily and with great facility by operating the crank from the side of the truck at a fixed location, preferably at the end of the rocker.

I am aware that the application of a jack to the truck for lifting cart-bodies is not new, and that the novel feature of my invention is the construction of the peculiar jack described, and its arrangement and location to effect a means of operating from a fixed location.

I claim and desire to secure by Letters Patent of the United States—

The combination of the screw-spindle A, provided with the ball-and-socket joint B B', and operated by the crank F, extended rod E, and bevel-gear C D, all bearing a fixed relation to the truck, with the swiveling-nut G and car-body, when arranged and operated substantially as described.

WILLIAM W. SAWYER.

Witnesses:
L. H. CLEMENT,
FREE F. RAYMOND, 2d.